(12) United States Patent
Beer et al.

(10) Patent No.: US 9,643,801 B2
(45) Date of Patent: May 9, 2017

(54) METHOD AND DEVICE FOR TRANSFERRING LAYERS OF ARTICLES BETWEEN ADJACENT MODULES

(71) Applicant: Krones AG, Neutrabling (DE)

(72) Inventors: Erhard Beer, Ebbs (AT); Martin Osterhammer, Frasdorf (DE)

(73) Assignee: Krones AG, Neutraubling (DE)

( * ) Notice: Subject to any disclaimer, the term of this patent is extended or adjusted under 35 U.S.C. 154(b) by 38 days.

(21) Appl. No.: 14/384,930

(22) PCT Filed: Mar. 6, 2013

(86) PCT No.: PCT/EP2013/054478
§ 371 (c)(1),
(2) Date: Sep. 12, 2014

(87) PCT Pub. No.: WO2013/135536
PCT Pub. Date: Sep. 19, 2013

(65) Prior Publication Data
US 2015/0110593 A1    Apr. 23, 2015

(30) Foreign Application Priority Data

Mar. 14, 2012 (DE) .................. 10 2012 204 030
Mar. 6, 2013 (WO) ................ PCT/EP2013/054478

(51) Int. Cl.
*B65G 57/24* (2006.01)
*B65G 57/06* (2006.01)
(Continued)

(52) U.S. Cl.
CPC ........... *B65G 57/24* (2013.01); *B65G 47/841* (2013.01); *B65G 47/844* (2013.01); *B65G 57/03* (2013.01)

(58) Field of Classification Search
CPC .................. B65G 57/24; B65G 57/245; B65G 2201/0235; B65G 47/90; B65G 57/06; B65G 61/00; B65B 35/50
(Continued)

(56) References Cited

U.S. PATENT DOCUMENTS

RE24,124 E  *  2/1956  Pierce ..................... B30B 7/023
                                                              414/267
4,055,257 A  *  10/1977  Krebs ...................... B31B 1/98
                                                              198/469.1
(Continued)

FOREIGN PATENT DOCUMENTS

CN        101533795 A       9/2009
CN        101628660 A       1/2010
(Continued)

OTHER PUBLICATIONS

German Search Report for DE 10 2012 204 030.7 dated Nov. 14, 2012.
(Continued)

*Primary Examiner* — Gregory Adams
(74) *Attorney, Agent, or Firm* — Dennemeyer & Associates, LLC (57) ABSTRACT

The invention comprises a method for horizontal movement of a group or layer of articles (10) from a vertically movable first support level (38) of a first module (12) to a vertically movable second support level (40) of a second module (14) immediately downstream of the first conveyor module (12) in a direction of transport or transfer (20, 50) while substantially maintaining the relative positions of a plurality of articles (16) forming the group or layer of articles (10). The movement or transfer is carried out by means of a transfer device (19). Additionally, the horizontal movement of the group or layer of articles (10) while the first and second support levels (38, 40) of the first and second modules (12,
(Continued)

14), which can move vertically in a synchronized fashion during the transfer process, are approximately aligned.

11 Claims, 8 Drawing Sheets

(51) Int. Cl.
*B65G 47/84* (2006.01)
*B65G 57/03* (2006.01)

(58) Field of Classification Search
USPC ... 198/418.4, 431, 435, 463.3, 468.3, 468.5, 198/468.6, 576, 580, 635, 637; 414/331.02, 331.04, 331.13, 331.14, 414/331.16, 331.17, 331.18, 416.05, 414/416.06, 416.09, 609, 610, 746.6, 414/790.3, 790.4, 791.4, 791.6, 792.6, 414/793.5, 793.8, 794.3, 794.7, 796.2, 414/796.9, 799, 933; 53/251, 252, 531
See application file for complete search history.

(56) References Cited

U.S. PATENT DOCUMENTS

| | | | | |
|---|---|---|---|---|
| 4,108,061 A * | 8/1978 | Bowser | ............... | B65B 13/18 |
| | | | | 100/26 |
| 4,205,934 A * | 6/1980 | Pantin | ............... | B65G 57/24 |
| | | | | 414/793.5 |
| 5,758,471 A * | 6/1998 | Denley | ............... | B65B 35/50 |
| | | | | 53/399 |
| 5,787,680 A * | 8/1998 | Tisma | ............... | B65B 5/06 |
| | | | | 53/244 |
| 6,846,147 B2 * | 1/2005 | Maser | ............... | B65G 49/085 |
| | | | | 414/331.09 |
| 7,104,027 B2 * | 9/2006 | Ford | ............... | B65B 5/106 |
| | | | | 53/237 |
| 2011/0005898 A1 * | 1/2011 | Pundsack | ............... | B65G 17/26 |
| | | | | 198/429 |

FOREIGN PATENT DOCUMENTS

| | | |
|---|---|---|
| CN | 201573984 U | 9/2010 |
| CN | 202054430 U | 11/2011 |
| DE | 28 41 195 C2 | 6/1984 |
| DE | 92 01 634 U1 | 7/1993 |
| DE | 20 2004 013601 U1 | 12/2004 |
| DE | 10 2008 015 278 A1 | 10/2009 |
| DE | 10 2010 011 534 A1 | 9/2011 |
| EP | 1 321 396 A1 | 12/2002 |
| GB | 1 150 300 A | 4/1969 |
| WO | WO 2010096111 A1 * | 8/2010 ........... B65B 35/405 |

OTHER PUBLICATIONS

International Search Report for PCT/EP2013/054478 dated Jul. 9, 2013.
International Preliminary Report on Patentability for PCT/EP2013/054478 dated Sep. 25, 2014.
Chinese Office action for CN 201380014372.3 dated Sep. 6, 2015.

* cited by examiner

METHOD AND DEVICE FOR TRANSFERRING LAYERS OF ARTICLES BETWEEN ADJACENT MODULES

The present invention concerns a method for horizontal transfer and horizontal movement of layers of articles between adjacent modules having the characteristics of independent method claim 1. The invention further concerns a related device having the characteristics of independent claim 9.

To palletise whole layers of articles, the articles normally first pass through a grouping station in which the articles transported are assembled into palletisable layers. These palletisable layers are then transferred from a supply station to a loading station. The loading station then deposits these layers of articles in a desired place. This place normally consists of a stacking area and a pallet located on it, on which the layers of articles can be deposited. The supply and grouping stations usually constitute a single unit and are directly coupled. The supply station, like the grouping station, comprises a support surface or level on which the articles are grouped and combined into a layer. The loading station also comprises a support level, which, in a manner known from the prior art, may consist of one, two, or more parts. In a support surface of the loading station consisting, e.g., of two parts, the support surface consists of two supports or transfer plates, which are closed when loaded and then subsequently opened during the removal or depositing phase to deposit the layer of articles on a stacking area or pallet. Numerous variants are known to persons skilled in the art, e.g., jalousie gripper heads, etc. Such a palletising method using a prior-art palletising device operates such that, first, articles are grouped into a palletisable layer by means of a grouping device and then transferred from a supply area or supply station to the loading station. To this end, it is necessary for the loading station, e.g., a jalousie gripper head arranged on a hoist element or a robot, to be connected to the supply area in order for the layer of articles to be transferrable to the loading station. The jalousie gripper head or loading station remains in place until the layer has been completely transferred from the supply station to the loading station. If the layer of articles is completely in the loading station, the loading station positions the layer of articles on a desired transfer point, normally on a pallet provided in a stacking area, by horizontal and vertical movements. Then, the same procedure repeats until the desired number of layers has been placed on the pallet.

Thus, DE 10 2008 015 278 A1 discloses a device for loading pallets with piece goods with a piece goods supply station and a transfer device to transfer the group of piece goods from the supply station to a pallet provided on a stacking area and/or a layer of piece goods that has already been transferred to the pallet. To improve palletising performance, this device proposes to configure the transfer device in subdivided support levels. It is provided for the size of at least some of the support levels to be selected such that a complete layer can be received from the piece goods supply station. The support levels are thus moved apart during loading and kept on opposite sides of the stacking area. For loading, the support levels are raised or lowered to a level corresponding to the height of the supply station. As soon as the same height has been reached, the next layer of articles is transferred to the support level. Thereafter, the support levels are raised or lowered to the level of the respective next layer, whilst the support levels are simultaneously moved together and the layer of piece goods is moved into the centre of the support levels. For depositing, the support levels are moved apart again. Due to the bipartite support levels, the aforementioned device has the advantage that, e.g., during the discharge of a full pallet, the transfer device can already raise or lower itself to the level of the supply station.

EP 1 321 396 A1 discloses a similar palletising device in which articles are moved laterally in an unsorted fashion and simultaneously grouped by a horizontal conveyor device before being transferred to a hoisting device in complete layers. The hoisting device or transfer platform thereby serves to compensate for differences in height between the grouping station and the loading station that stacks the layers on top of one another and deposits them on a pallet by opening a retractable floor. The document further discloses that the transfer platform cannot receive and transfer a number of rows of articles in a single phase of movement, which is necessary in order to form a complete layer of articles. The advantage of this is considered to be the fact that, due to the smaller design of the transfer platform and the incomplete raising of an entire layer of articles, less weight needs to be lifted, and thus less energy is consumed than when raising the loading station itself.

Numerous variants are known from the prior art that are able to stack articles assembled in layers on a pallet. However, all of the prior art methods and devices share the disadvantage that, in order to transfer the layer of articles from a supply station or transfer platform into or onto a loading station, the support surfaces of those elements must be fixed and cannot move vertically during the transfer of the layer of articles. This results in substantial loss of time in the sense that the beginning of the transfer of the layer of articles can only take place once the loading station or transfer platform has been completely positioned and brought to a stop. It is thus always necessary to wait until the loading station has reached the stationary supply station before the transfer of the layer of articles can begin. If a transfer platform is used, it is also necessary to wait until the transfer platform has reached the current position of the loading station. Only then can the transfer of the layer of articles begin. Additionally, the respective stations do not execute any vertical movements during the transfer of the layer of articles until the layer of articles has been completely transferred. Either the loading station is moved in to the next respective transfer position only after transferring the layer of articles, or the loading station is already in the next desired transfer position at the time the layer of articles is being transferred.

A primary objective of this invention is to substantially eliminate the waiting times required until a support level of a single station has approached an unmoving support level of another station in the context of respective vertically movable support levels of consecutive stations of a transport system, in order thus to begin transferring layers of articles between the stations substantially earlier. Another objective of the invention is to minimise the times between depositing a layer of articles and receiving another layer of articles. Thus, the time required by the loading station after depositing a layer of articles to move to a next position to deposit a layer of articles is to be used in order for a subsequent layer of articles to be transferred as the loading station approaches the next position.

The aforementioned objectives are substantially met by the subject matter of the independent claims by providing better mobility and control of the available modules within a conveyor line between articles being transported and their palletisation, in order to begin the transfer of articles grouped in layers earlier by means of simultaneous transfer and raising and lowering processes for complete layers of articles, and to allow for the transport of the layer of articles when the raising or lowering processes of the individual modules or their support levels have not yet been completed. In this way, the transport of layers of articles within a conveyor line can be accelerated in such a manner that the vertically movable support surfaces of the modules need not necessarily come to a stop; instead, by their synchronised movements—i.e., synchronised raising or lowering movements—they allow the transfer to begin before the vertical movements have been completed.

It should be emphasised that, for simplicity, in the following description and the claims, the terms 'supply station', 'loading station', and 'transfer station' are used interchangeably with the term 'module'. Each of these stations is associated with at least one support surface or level that is suited to receive a layer of articles. Thus, for example, the support level or surface of the loading station may consist of two parts. However, the support levels or surfaces of the supply station or transfer station normally consist of one part. Additionally, it would be possible for each of the support surfaces or levels to consist of driven, circulating modular belts, roller conveyors, etc.

To meet the aforementioned objectives, the invention proposes, on the one hand, a method for horizontal movement of groups or layers of articles from a first vertically movable support surface or level of a first module to a vertically movable second support surface or level of a second module immediately downstream of the first conveyor module in a direction of transport. The transfer is carried out by means of a suitable transfer device, which can transfer the layer of articles between the two approximately aligned support levels of the two modules in the direction of transport, wherein, according to the invention, approximately synchronised raising or lowering movements and/or raising and lowering movements in the same direction are possible for the support levels, in particular in order to optimally position the second module and its support level or surface already during the transfer movement, e.g., relative to a stack height of layers of articles that have already been deposited on top of one another in a stacking area. The vertical movements of the two modules or their support levels, which can occur during the transfer movement of the layer or group of articles, allows for minimisation of the necessary time from the transfer of the layers of articles to the depositing of the layers of articles, thus contributing to temporal overlap or synchronicity of individual steps necessary for palletising layers of articles. This temporal and/or procedural overlap of individual steps saves time, thus substantially contributing to an increased output of the palletising method as a whole. For persons skilled in the art, it is obvious that the relative positions of a plurality of articles forming the group or layer of articles should be approximately maintained during this horizontal transfer.

In the method according to the invention, it is provided for the horizontal transfer of the group or layer of articles to occur whilst the first and second support levels of the first and second modules are nearly at the same level. To ensure this alignment of the first and second support levels of the first and second modules, it is not necessary for the support levels to be at rest or stopped. Instead, according to a preferred embodiment of the method according to the invention, an upward or downward vertical movement of the modules or support levels occurs during or already shortly before the beginning of the transfer of the layer of articles. Depending on the current stack position, the time of the vertical movements of the support levels of the modules, which are approximately synchronised and in the same direction, may suffice for the layer of articles to be completely transferred from a support level of the first module to the support level of the second module. However, it is also possible for the duration of the vertical movements of the two modules, which are approximately synchronised and in the same direction, and thus of the two support levels, may not be sufficient for the layer of articles to be completely transferred from the first support level to the second support level of the two modules; accordingly, the movement remaining for the complete transfer of the layer of articles must occur with the modules or support levels already positioned and thus no longer vertically moving. Common to both of these cases is the advantage, in particular, that the transfer of a layer of articles from a first support surface of a first module to a second support level of a second module may begin immediately before or during an approximately synchronized vertical movement of the support levels in the same direction. Thus, the layer of articles is transferred already during the positioning of the two modules.

Of course, the transfer may optionally occur with the modules and their related support levels at a complete stop if they previously approached one another in such a way that travel paths and thus process times were saved to the extent possible, such that the transfer processes overall—i.e., in the sum of all necessary steps—could take place in a shorter time or at a higher speed. In particular with vertically moving modules, it is possible to reduce the time for the transfer of the layers of articles because there is no need here to wait until the modules have come to a stop; rather, the transfer can occur whilst the modules are moving as long as the vertical movements are synchronised and coordinated such that no step arises between the support levels that could obstruct the transport of the articles.

In a variant of the method according to the invention, it is also entirely possible for the first support level of the first module to be slightly lower or higher at least temporarily or in certain phases than the second support level of the subsequent module, thus creating a step. In this case, the articles may be pushed upward or downward onto the subsequent, second module, e.g., via a small ramp. This variant allows for the transfer process to begin before the support levels are completely aligned, which may also save time for the transfer process, and thus the entire palletising process. Of course, it is also possible for the support levels to be substantially aligned even before contacting the second support level with the transferred articles, and to this end to have reached the same height.

On the other hand, the various variants of the method according to the invention, due to the coordinated vertical control of the support levels of the consecutive first and second modules, allows for the transfer of the group or layer of articles from the first support level of the first module to the second support level of the second module to begin immediately before the formation of the common support level of the first and second support levels, or simultaneously with this phase. Because the foremost articles of a complete layer of articles are normally not on the outermost front edge of the first support level, the transfer movement may already begin in the absence of a common support level. The level need only be formed at least approximately, possibly with a slight step, once the first articles actually cross the boundary between the two support levels and are pushed onto the second support level of the second module. Additionally, in their substantially synchronised vertical movements, which occur at least at some times or in some phases, the first support level of the first module and the second support level of the second module must form the aforementioned common support level at least long enough for the group or layer of articles to be completely transferred to the second support level located in its corresponding final position. The common support level may thus be separated immediately after the hindmost row of the complete layer of articles has passed, e.g., due to the first support level of the first module carrying out an additional vertical movement in order to approach a module that is upstream in the direction of transport, from which another layer of articles can be received.

In the context of this invention, it is also important for the relative positions of a plurality of articles forming the group or layer of articles to be approximately maintained during the aforementioned horizontal movement of the group or layer of articles between the consecutive support levels. The transfer is thus carried out by means of a suitable transfer device, which can transfer the layer of articles between the two approximately aligned support levels of the two modules in the direction of transport, wherein, according to the invention, an approximately synchronised raising or lowering movement is possible simultaneously, in particular in order to optimally position the second module during the transfer movement, e.g., relative to a stack height of layers of articles that have already been deposited on top of one another in a stacking area. The ability to carry out the vertical movements of the two modules during transfer allow for the necessary transport times to be minimised, and contribute to increasing the attainable transport speeds.

In order to detect the at least temporarily coordinated vertical movements of the two support levels of the first and second modules, it can be useful to permanently record the current vertical positions of the support levels, wherein the values obtained can be processed to calculate an approach in order to prepare the transfer process. The objective of this position recording and data processing is an optimally coordinated movement of the two support levels of the consecutive modules, thus minimising transfer times. This can be achieved by minimising non-synchronised and/or opposite movements of the support levels in favour of the phases with synchronised movements as soon as a layer of articles is to be transferred.

The transfer device may consist, e.g., of at least one push bar engaging the articles in the rear of the group or layer of articles in the direction of transport or feed. Additionally, provision may optionally be made for a support bar, which is at least temporarily associated with the articles in the front in the direction of transport, and which runs slightly ahead of the front articles or abuts them at least briefly before reaching the resting position. The first module may consist, e.g., of a transfer unit or a transfer table with a vertically movable support level, whilst the second module may consist of a loading station that also comprises a vertically movable support level. An useful control rule may provide for a current vertical position of the loading station or of the second support level of the second module to dominate the direction of a vertical movement of the transfer unit or of the first support level of the first module in order to bring the two modules or their support levels nearer to one another.

Since the transfer of grouped articles or layers of articles between adjacent hoist elements previously required each of the stations to be stopped and not to carry out any simultaneous hoisting movements, the overall output of such known palletising devices is limited. Although the support and push bars of the transfer device that simultaneously abut the front and rear of the layer of articles allow for the stabilisation of all articles during transfer, such that the layers can be transferred at relatively high speeds, these speeds cannot be increased to any desired level, and are limited by the physical capabilities as well as the respective stopping of the hoist elements during transfer, which can only be moved vertically to continue transferring the layer of articles once the transfer movements have been completed. In this invention, on the other hand, the overall output of a palletising device can be increased by means of simultaneous movements, which is achieved by allowing the transfer of a layer from one module, e.g., a hoist station, to another module, e.g., another hoist station while the hoist elements are still in motion or whilst the vertical movements continue. To transfer a layer from a hoist station to another hoist station whilst the hoist elements are still moving, the two hoist elements are usefully coupled by means of a suitable axle coordination system. Depending on the processing cycle, this axle coordination is activated or deactivated. This allows for reduction of the palletisation time for a layer. During transfer, other axles (e.g., hoist elements) need not wait until the transfer has been completed.

The layers of articles, which can be transferred at high speed between adjacent modules or hoist elements, are stabilised by the interaction of the push bar pushing from behind and the optional support bar, which provides stability in the front, wherein the layer of articles may usefully be laterally guided in this conveyor section. By the action of the push bar in the rear and the lateral guides, relative positions of a plurality of articles forming the group of articles can be substantially maintained relative to one another, i.e., the configuration of the article group moved remains substantially intact. This is achieved substantially by having the support bar of the group of articles run slightly ahead of the front articles or abut them at least briefly before reaching the resting position. Such control of the second or support bar depending on the transport movements of the group of articles comprises both a movement control, in which the support bar moves slightly ahead of the layer of articles, and a movement control, in which the support bar abuts the group of articles at least shortly before or upon reaching the resting position, thus contacting and stabilising them at least during the last phase of the braking process. Additionally, the invention comprises a further movement control variant, in which the support bar stabilises the group of articles initially during the deceleration process, but removes itself from the group of articles immediately before coming to a stop. This can be related to the fact that the deceleration of the group of articles is not even, and instead gradually becomes gentler shortly before reaching the resting position in order to prevent a sudden, jerky stop of the group of articles. In such a gentle stop, which may be preceded by a deceleration phase with stronger deceleration from a higher transport speed, there is no need for the group of articles to be in contact with the support bar immediately before stopping, such that it can already be removed and accelerated away from the group.

In the manner described, it is possible to prevent the foremost articles of the article group moving or falling over when the group of articles is slowed or stops, in particular upon reaching a target position of the article group. Generally, the individual articles of the article group moved are not only subject to destabilisation when the transfer speed is reduced. During acceleration, too, as well as during transfer from the one conveyor unit of the first module or hoist element to the conveyor unit of the subsequent module or hoist element, high transfer speeds, as well as the transitions between the two conveyors, may cause individual articles to slip or fall over; the movement control according to the invention for the support bar moving ahead of and/or abutting the article group is meant to prevent this.

By the aforementioned nearly form-fitting transfer of a layer of articles or formatted group of articles from one station or hoist element 104 to another, subsequent station or hoist element 101 in the direction of transport, the method according to the invention allows for fast transfer movements, because a retention bar or stop moving along with the feed movements of the layer of articles can protect the individual articles of the layer from slipping or falling over. In addition to the aforementioned coordinated vertical control of consecutive stations, the use of the push and support bars movable in coordinated horizontal controls allows for especially fast transfer processes.

When articles or layers of articles are referred to in this regard, this may generally refer to widely varied packaged goods, e.g., individual cartons, beverage containers such as bottles, cans, or beverage cartons, piece goods, etc., that can be palletised, stacked, or depalletised in specified configurations. Articles may also include bundles, e.g., film-wrapped or strapped bundles or the like.

This invention further comprises a device for horizontal movement of a group or layer of articles between at least two vertically movable support levels of adjacent modules whilst substantially maintaining the relative positions of a plurality of articles constituting the respective group or layer of articles. This device comprises a suitable transfer device for the horizontal movement of the layer of articles onto the support level of an adjacent module. According to the invention, the first and second support levels of the first and second modules are at least approximately aligned in order to allow for the unobstructed horizontal transfer of a group or layer of articles between the support levels of the modules. The first and second support levels of the first and second modules are each vertically movable, and their vertical movements can be synchronised for horizontal movement of the group or layer of articles with the first and second support levels approximately aligned, such that the transfer movement can occur during the joint raising or lowering of the modules, thus saving time due to faster transfer processes.

Additionally, the device may provide for the first and/or second modules each to be associated with position sensors 106, 105 to detect the current vertical positions of the first and second support levels, the values of which can processed in order to calculate an approach to prepare a transfer process. Using these sensors 106, 105, the vertical positions of the support levels can be determined at all times and coordinated in a control 107 that processes the signals of the sensors 106, 105, such that transfer movements are possible whilst the modules are moving vertically.

The first module may consist, e.g., of a transfer unit or a transfer table with a vertically movable first support level, whilst the second module may consist of a loading station having a vertically movable second support level. Additionally, it may be advantageous if a current vertical position of the second support level of the loading station or of the second module dominates the direction of a vertical movement of the first support level of the transfer unit or of the first module in order to achieve an approach of the two support levels to one another. However, a first module may also consist of a grouping table or the like. A second module may also consist, e.g., of a lift and/or a jalousie gripper head or another hoist element allowing for height compensation. In the context of this invention, height compensation refers, in particular, to the possibly of stacking during transfer of the layers of articles to one of the modules. Because the layers of articles are generally stacked in multiple layers during palletisation, the height of at least the one of the modules must be adjustable. This adjustable height includes both the possibility of lowering to transfer the layers of articles on a lower level and the possibility of raising above the level of the first and/or second module in order to be able to deposit the layers of articles on top of layers of articles that have already been stacked. This applies accordingly to depalletisation, since a stack of multiple layers of articles to be depalletised gradually becomes smaller, requiring an adjustment of the height of the receiving module, as the removal progresses.

The transfer device may comprise at least one push bar engaging the articles and at least one support bar engaging the front of the layer of articles, the movements of which are at least temporarily coupled with the push bar, thus preventing tipping or slipping of articles during fast transfer or braking movements. Optionally, at least one of the push bars and/or at least one of the support bars may be coupled with an endlessly circulating pull drive to generate the pushing movements. However, other drives are also possible for the push and support bars, e.g., linear drives.

Exemplary embodiments of the invention and its benefits will be discussed in greater detail below by reference to the attached drawings. The size ratios of the individual elements to one another in the drawings do not always correspond to the actual scale, because some shapes are simplified and others are enlarged relative to other elements for ease of illustration.

FIGS. 3-13 show various consecutive schematic views of the steps of the transfer of a layer of articles between three adjacent modules.

Identical reference numerals are used to designate the same or functionally similar elements of the invention. Additionally, for ease of reference, only reference numerals required for the description of the respective drawing are included in each drawing. The embodiments shown are merely examples of possible configurations of the device or method according to the invention and are in no way intended as limitations thereof.

Figures 1A, 1B:
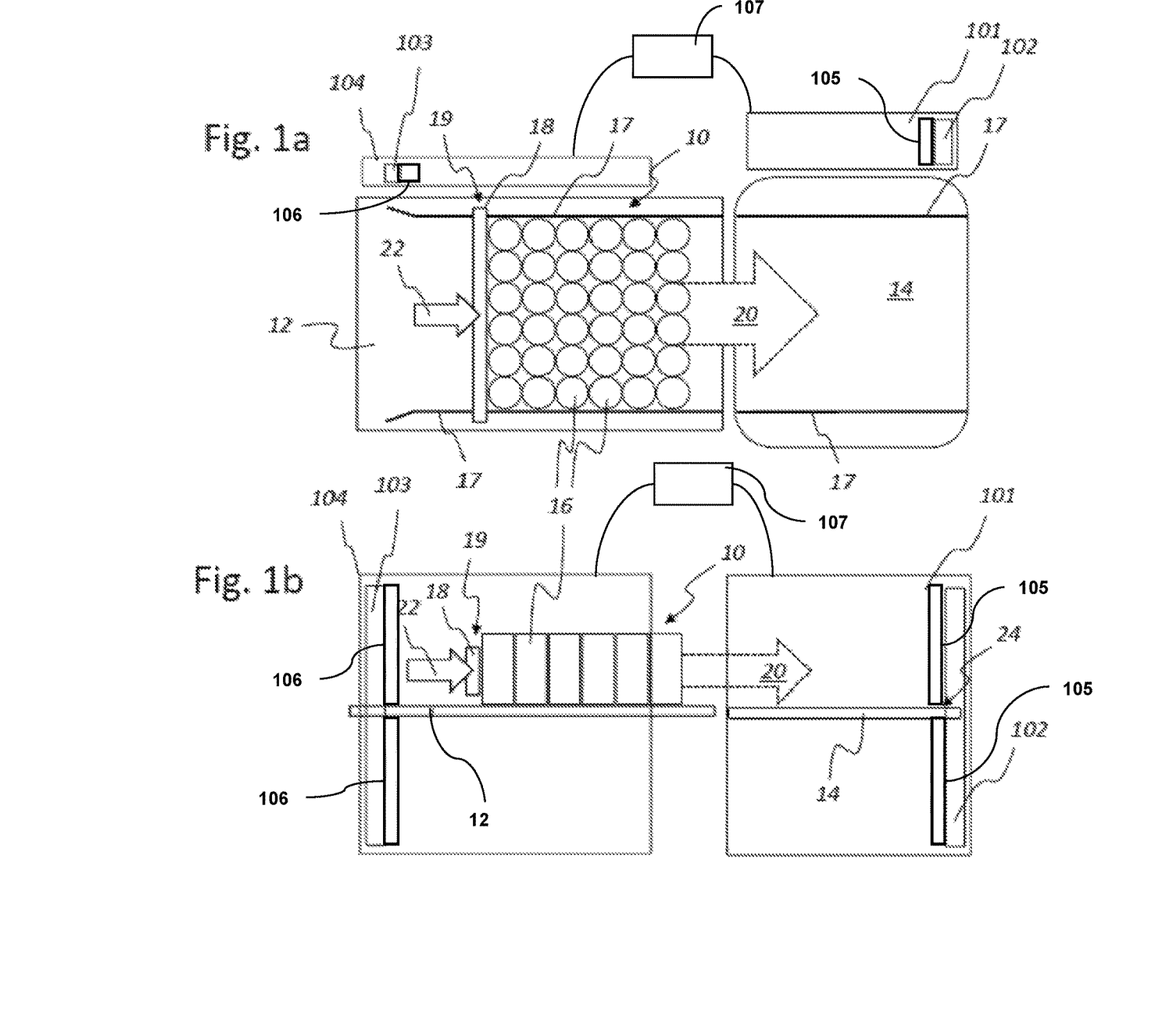
FIG. 1 shows two schematic views of the beginning of a movement transferring a layer of articles from one module to an adjacent second module.

FIG. 1 shows a schematic top view (FIG. 1*a*) and a schematic side view of a horizontal movement of a group or layer of articles 10 from a first position from a first module 12, which may be a a hoist 104, e.g., a grouping table that may be part of a grouping system, into a second position of a second module 14, which may be a hoisting module 101 or a loading station, etc. In the exemplary embodiment shown, the layer of articles 10 shown comprises a regular configuration of a plurality of articles 16 in a rectangular group, to be transferred by means of a transfer device 19 or a push bar 18 from the first module 12 to the second module 14 without changing the configuration. As shown in FIGS. 3-13, the transfer device 19 may additionally comprise a support bar, not shown in FIGS. 1 and 2, which supports and stabilises the front of the layer of articles 10, thus preventing tipping or slipping of individual articles 16 during rapid decelerations of the layer 10. The articles 16 may be, e.g., cartons, bundles of several individual articles or containers, or individual containers standing adjacent to one another in a regular configuration. Normally, the articles 16 have a height greater than the lateral edge of their base surface, such that they tend to tip in the event of sudden accelerations or decelerations; this is prevented by the configuration of the transfer device 19 with a push bar 18 and a support bar (not shown, cf. FIGS. 3-13).

The push bar 18 of the transfer device 19, responsible for pushing the group or layer of articles 10, engages the articles 16 in the rear of the group 10 in the direction of transport or feed 20, and thus moves the entire group or layer of articles 10, which may be laterally guided in order to maintain the layer configuration. The optional lateral guides are indicated with the reference numeral 17 in FIGS. 1a and 2a. By the action of the push bar 18 in the rear and the lateral guides 17 arranged on either side of the transfer path, the relative positions of a plurality of articles 16 forming the group of articles 10 can be substantially maintained relative to one another, i.e., the configuration of the article group 10 moved remains substantially intact along the forward movement 20.

In the following figures, the lateral guides 17 are omitted for ease of reference; however, this does not mean that the guides are not present.

Figures 2A, 2B:
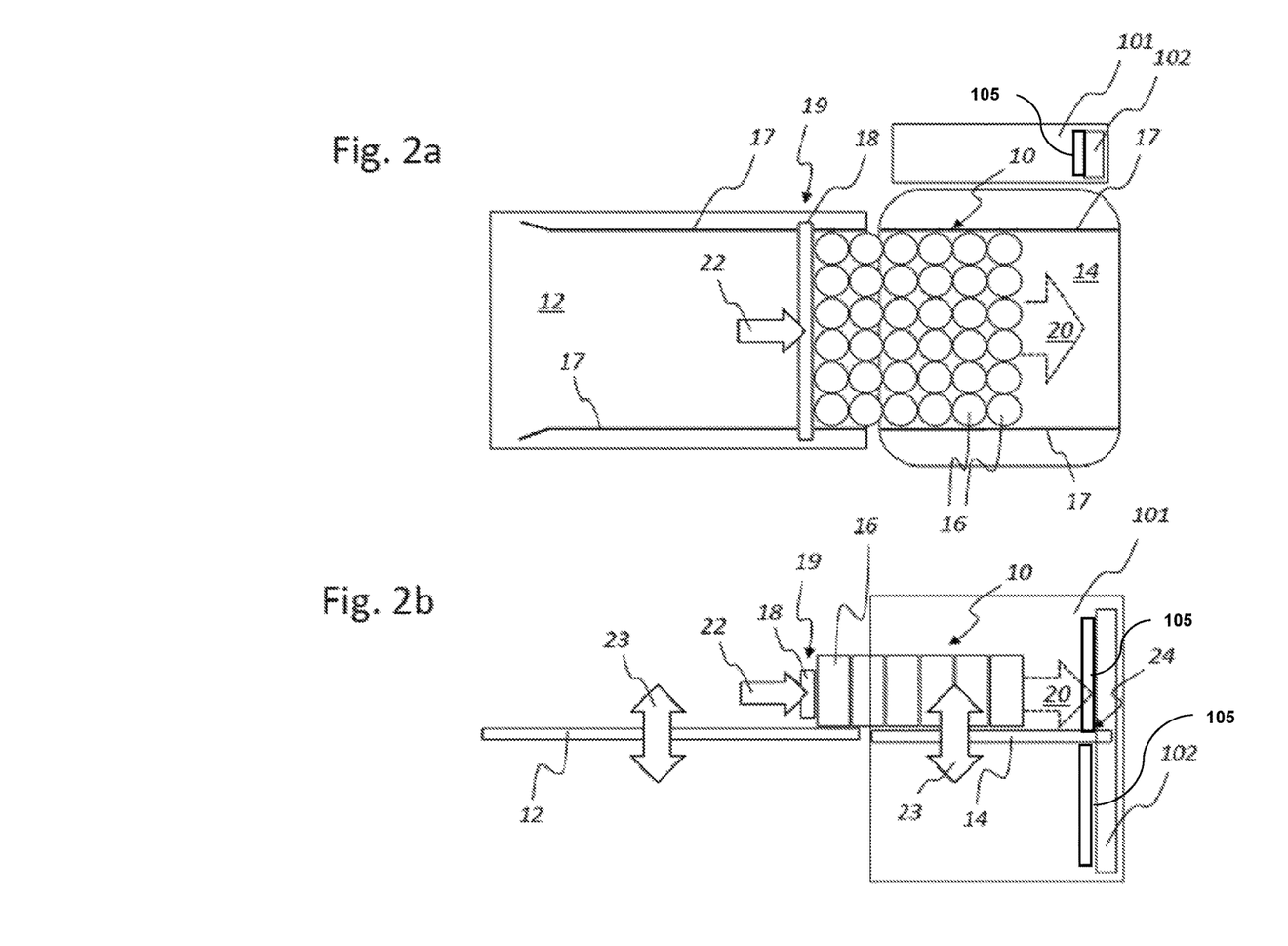
FIG. 2 shows two views of the completed transfer movement of FIG. 1.

As illustrated by the two schematic representations of FIG. 2 with the top view of FIG. 2a and the side view of FIG. 2b, the forward movement 20 does not occur at constant speed because the pushing movement 22 of the transfer device 19 or push bar 18 gradually slows at least shortly before reaching the target position of the layer of articles 10 on the second module 14 in order to avoid sudden stops. The risk that some of the foremost articles 16 of the article group 10 slip or fall over when the group or layer of articles 10 rapidly decelerates or suddenly stops, in particular upon reaching a target position of the article group 10 is reduced using the aforementioned support bar. Because the push bar 18 typically moves the group of articles 10 relative to a support level 24 of the first and/or second module 12, 14 on which the articles 16 slide, there is constant dynamic friction between the bottoms of the articles 16 and the support level 24, which generates constant frictional resistance between the sliding surfaces. For this reason, abrupt deceleration of the layer of articles 10 may result in individual articles 16 falling over or moving relative to the adjacent articles 16, which can be prevented by the support bar shown in FIG. 3 et seq.

As indicated by FIG. 2b, the invention allows for synchronised vertical movement 23 of the two modules 12 and 14 with their drives 102, 103 during transfer, such that the horizontal pushing movement 22 of the layer of articles 10 and the synchronised vertical hoisting movement 23 of the modules 12 and 14 may overlap, allowing for significant time savings in the transfer process compared to the palletising devices used heretofore.

The schematic views of FIGS. 3-13 illustrate in a total of twenty three individual representations the consecutive steps of transferring a complete layer of articles 10 between three adjacent modules 12, 14, and 30. In this exemplary embodiment, the third module 30 respectively shown on the left may consist, e.g., of a grouping system 32 or supply area that supplies grouped layers of articles 10 one after another. These layers of articles 10, which are brought into the layer configuration by a sorting and/or grouping system not shown here, are then available on the grouping table or system 32. Such a grouping or sorting system may comprise, e.g., one or more handling robots forming cohesive layers 10 out of one or more article flows that are transferred, as shown, to the third module 30 or the grouping system 32. The height and lateral position of the grouping system 32 need not be adjustable; rather, the system 32 may be fixed, as also shown in FIGS. 3-13. Optionally, however, the grouping system 32 may also be adjustable in height, in particular with optional omission of the transfer unit 34 (not shown) downstream of the grouping system 32. In such a configuration, the adjustable-height grouping system 32 may be prepared for direct transfer of the layers of articles 10 to the loading station 36. In this case, the push bars and support bars normally associated with the transfer unit 34 are associated with the grouping system 32, and their movements must be controlled appropriately.

As can be seen in FIGS. 3-13, the horizontal movement of the layer of articles 10 occurs with the first and second support levels 38 and 40 of the first and second modules 12 and 14 or the transfer unit 34 and the loading station 36 being aligned. As can be seen in particular in FIGS. 6-10, to ensure this alignment of the first and second support levels 38 and 40 of the first and second modules 12 and 14, the support levels 38 and 40 need not be at rest or stopped. Rather, according to a central aspect of this invention, the transfer of the layer of articles 10 may also occur with the support levels 38 and 40 of the modules 12 and 14 moving vertically upwards or downwards, whereby these vertical movements must be synchronised at least until the layer of articles 10 has been completely transferred (cf. FIG. 10). For completeness, it should be noted that the loading station 36 may already have reached its target position before the transfer of the complete layer of articles 10. In this case, of course, the two support levels 38 and 40 need not be synchronised in their movements until the transfer of the layer of articles 10 has been completed; they may also both be stopped. To the extent that the target position for the second layer of articles 40 has been reached, it will come to a stop and must be stopped in this case before all articles are transferred. The vertically moving first and second support levels 38 and 40 of the first and second modules 12 and 14 make it possible to reduce the overall time for the transfer of the layers of articles 10 because there is no need here to wait until the support levels 38 and 40 have come to a stop; rather, the layer 10 can be transferred whilst the support levels 38 and 40 are moving together in a synchronised fashion, as long as the vertical movements are synchronised and coordinated such that no step arises between the support levels 38 and 40 that could obstruct the transport of the articles. A slight downward step between the two support levels 38 and 40, however, is acceptable as long as it does not obstruct the transfer movement. A slight upward step between the first and second support levels 38 and 40 may also allow for unobstructed transport of the articles if a suitable ramp is used to ensure that the articles 16 cannot be caught or tip on the step.

In order to detect the at least temporarily coordinated vertical movements of the first and second support levels 38 and 40 of the first and second modules 12 and 14, suitable sensors 106, 105, as shown in FIGS. 1a and 1b, may be provided that allow for constant recording of the current vertical positions of the support levels 38 and 40, whereby the values obtained can be processed to calculate an approximation in order to prepare the transfer process. The purpose of this position detection and data processing is the optimal coordination of the movements of the two vertically movable support levels 38 and 40, such that the transfer times, i.e., the time until the beginning of the transfer of the layers of articles between the transfer unit 34 and the loading station 36 can be minimised. This can be achieved by minimising non-synchronised and/or opposite movements of the support levels 38 and 40 in favour of the phases with synchronised movements as soon as a layer of articles 10 is to be transferred. An advantageous control rule may provide, e.g., for a current vertical position of the loading station 36 or of the second support level 40 of the second module 14 to dominate the direction of a vertical movement of the transfer unit 34 or of the first support level 39 of the first module 14 in order to bring the two support levels 38 and 40 of the two modules or their support levels nearer to one another.

Figure 3:
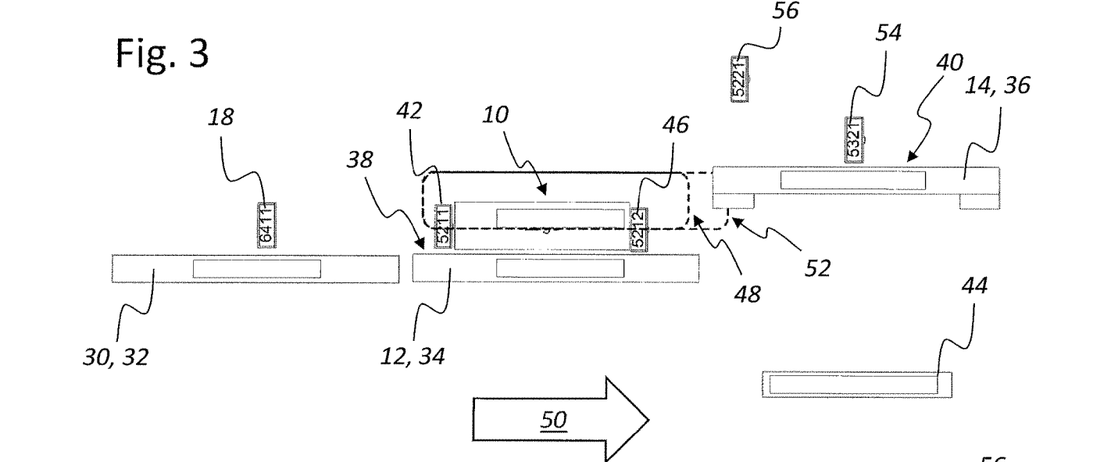
Figure 4:
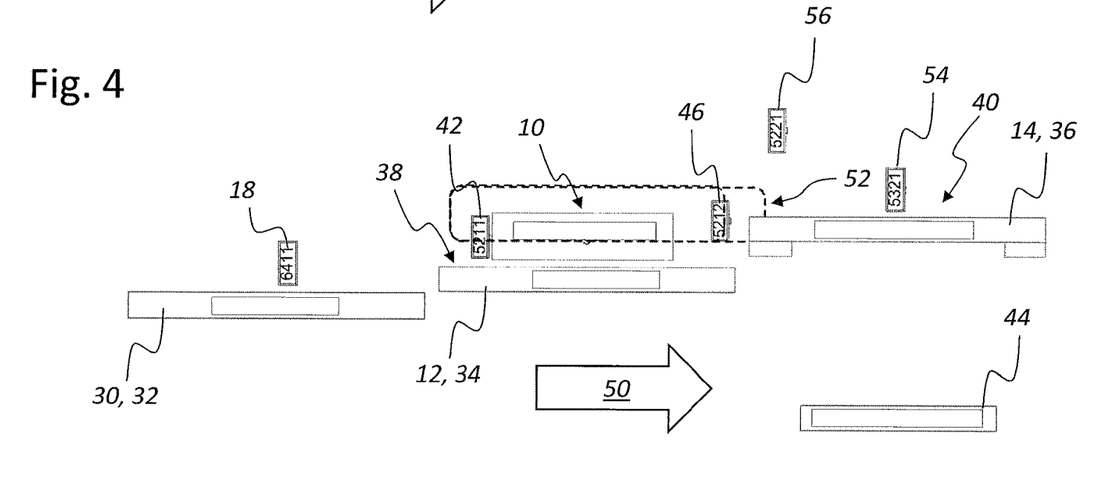
Figure 5:
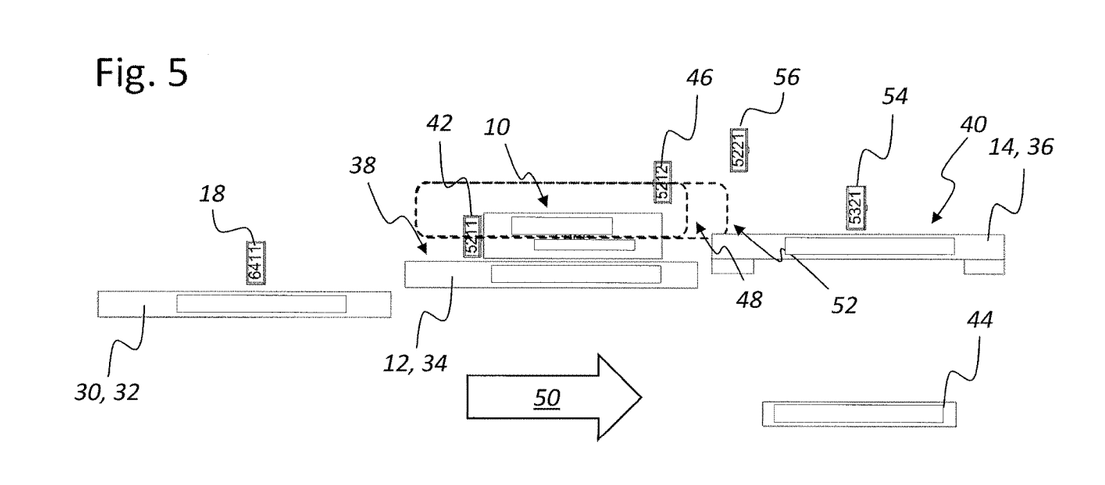
Figure 7:
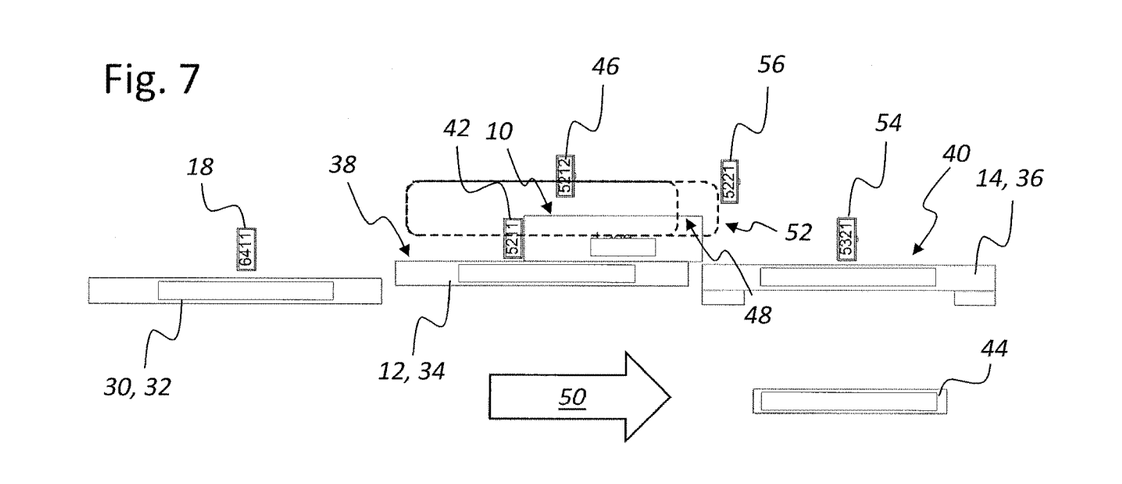
Figure 10:
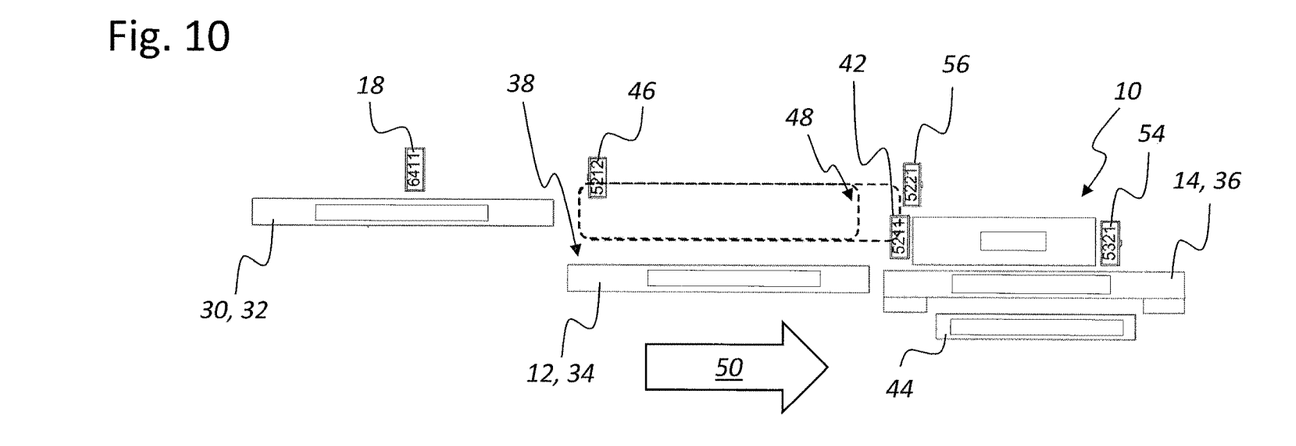

FIG. 3 shows a layer of articles 10 already transferred from the third module 30, the grouping system 32, to the first module 12 or transfer unit 34 downstream of it, which can be moved to the right onto the second module 14 above the vertically movable transfer unit 34, as shown in FIG. 7. As noted above, the first module 12 consists here of a transfer unit 34 or transfer table, which is formed so that its height is adjustable in order to allow for transfer to the loading station 36, which has been moved to the same height. In the exemplary embodiment shown, this loading station 36, the height of which can be adjusted depending on the loaded or unloaded state of a pallet segment 44 arranged below it, is the second module 14. As illustrated in FIGS. 7-10, the layer of articles 10 is transferred horizontally to the right from the first module 12 or transfer unit 34 onto the second module 14 or loading station 36 by means of the push bar 42 associated with the first module 12, whereby a first support bar 46 associated with the transfer unit 34 stabilises the foremost articles of the layer of articles 10 and prevents individual articles slipping or tipping. The first support bar 46 moves over nearly the entire length of the first module 12 or the transfer unit 34. FIG. 10 additionally shows a particular feature of this embodiment in which the first push bar 42 is pushed beyond the transfer unit 34 onto the edge of the loading station 36 before being retracted according to FIG. 11 in order to transfer another layer of articles 10 from the first module 12 or transfer unit 34 onto the second module 14 or loading station 36.

Figure 6:
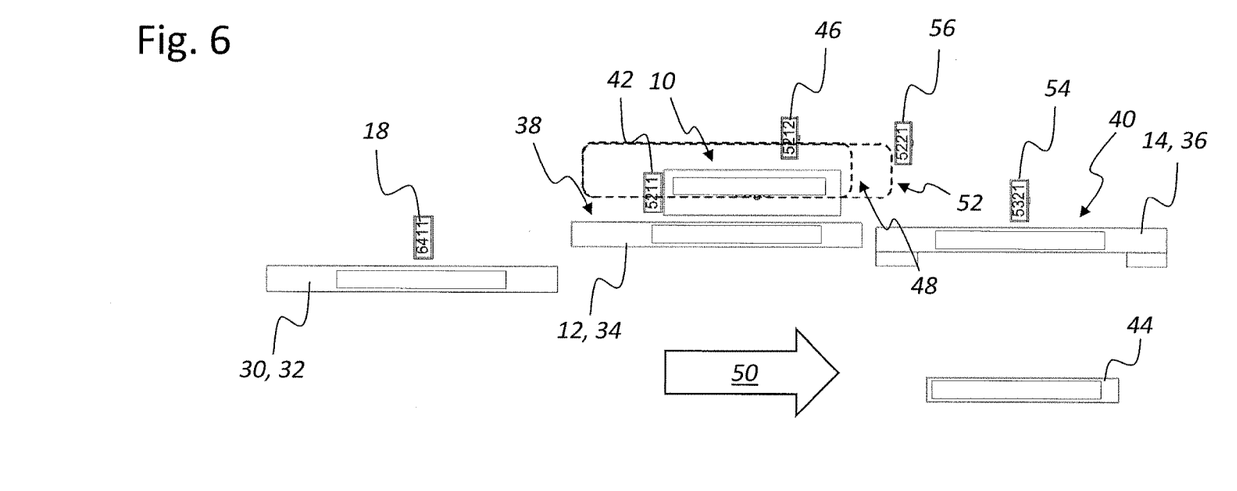

As illustrated by FIGS. 3-6, to transfer the layer of articles 10 from the transfer unit 34 to the downstream loading station 36, its support levels 38 and 40 must be brought approximately to the same height so that they are at least approximately aligned, allowing for unobstructed transfer of the layer of articles. Whilst in the phase of FIG. 3 the transfer unit 34 is still at the height of the upstream grouping system 32 and significantly below the loading station 36, the transfer unit 34 with the layer of articles 10 on it is raised vertically, whilst the loading station 36 is simultaneously lowered (FIG. 4, FIG. 5), which may result in a significant reduction of the process time for the palletisation of the layers of articles 10. In the step of FIG. 6, the support levels 38 and 40 of the first and second modules 12 and 14 have come near enough to one another that the transfer of the layer of articles 10 from the transfer unit 34 to the loading station 36 can begin by moving the first push bar 42 to the right. The first push bar 46, which was required to stabilise the layer of articles 10 for the transfer process of the layer of articles 10 from the grouping system 32 to the transfer unit 34, is returned to its initial position during the transfer, to which end it describes a first path 48 having two horizontal sections parallel to the first support level 38 and two vertical connecting sections, resulting in an active movement section at the height of the layer of articles 10 to be stabilised and an inactive return section above the layer of articles 10, on which the first support bar 46 is returned to the front edge of the transfer unit 34, after it has stabilised the layer of articles 10 until they come to a stop on the transfer unit 34. It should, however, be noted that the support bar 46 may be controlled such that there is no need for the layer 10 to stop at all. The bar 46 may be, e.g., moved away from the layer of articles 10 with suitable acceleration, such that the layer of articles 10 can remain in constant transfer movement.

Figure 11:
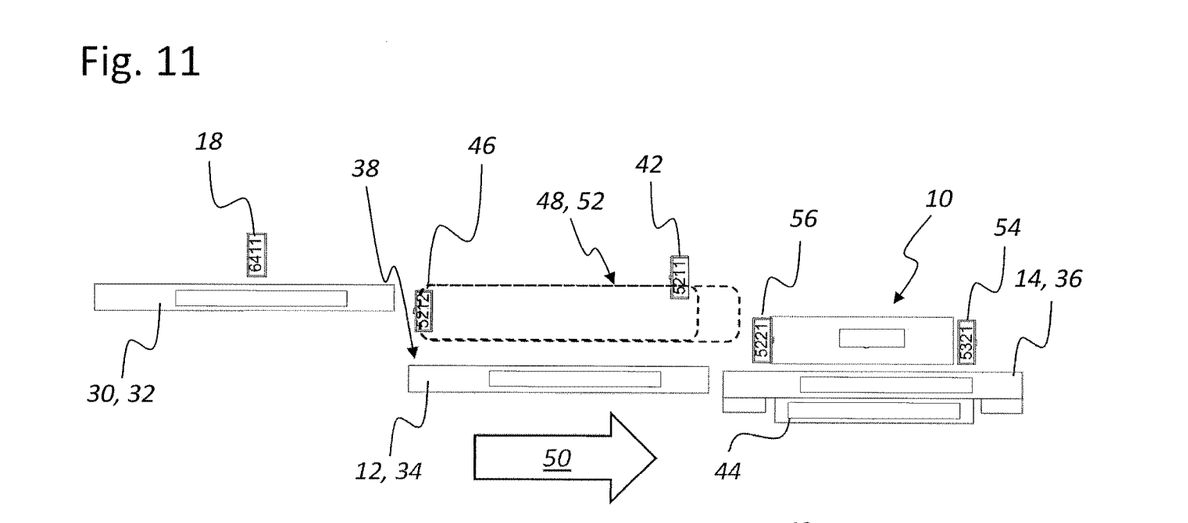

As shown by FIGS. 6-10, the transfer of the complete layer of articles 10 from the first module 12 to the second module 14 may occur as soon as its support levels 38 and 40 are approximately aligned. At the beginning of the transfer movement (FIG. 6), the first support bar 46 is already above the layer of articles 10 in the inactive return section of the first path 48, in order to be moved to the front edge of the transfer unit 34, where it can be provided in order to receive another layer of articles 10 from the grouping unit 32 (cf. FIG. 11). The first push bar 42, on the other hand, moves in the direction of transport 50 of the layer of articles 10 and along a second path 52, which overlaps with the course of the first path 48 of the first support bar 46 to a great extent. As, however, can be seen in particular in FIG. 10, the second path 52 extends in the direction of transport 50 beyond the length of the first support level 38 of the transfer unit 34 and over the edge of the second support level 40 of the loading station 36, such that the layer of articles 10 can be transferred without interruption to the loading station 36, where the first push bar 42 moves upward and is thus removed from the area of engagement with the layer of articles 10; thereafter, it returns via the inactive return section of the second path 52. Thus, FIGS. 11-13 illustrate a path of the first push bar 42 extending beyond the length of the transfer table 34 and partially into the area of the loading station 36 of the third module 14. This extended path of the first push bar 42 allows transfer of the layer of articles 10 in one pulling movement from the first module 12 to the second module 14 or its support levels 38 and 40 without a need for interruptions in the transfer movement.

In order to allow for independent movement of the first push bar 42 and the first support bar 46 on their respective paths 48 and 52, normally separate drive systems are provided, which can be controlled independently. These may be separate pull drives or chain drives, etc. having electrical drive motors.

Figure 8:
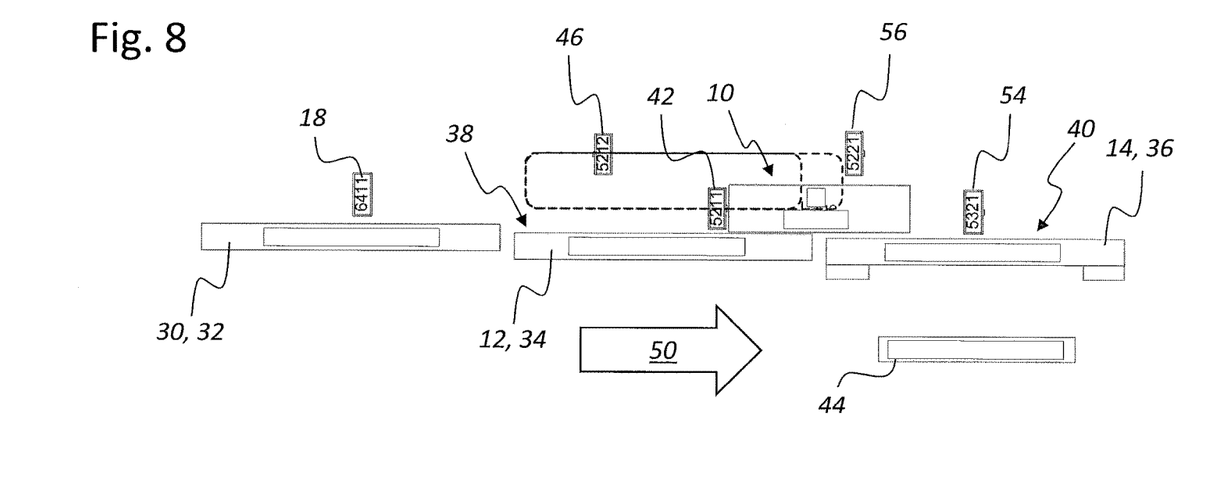
Figure 9:
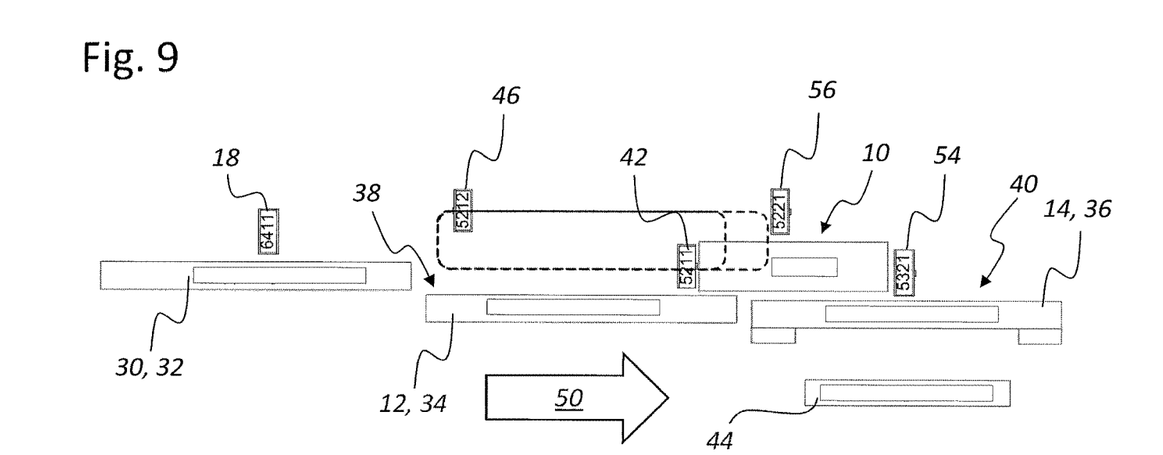

A second support bar 54, associated with the loading station 36, which, in at least some sections, moves approximately simultaneously with the push bar 42 to the right whilst moving ahead of the article layer 10, stabilises the layer of articles 10 there and prevents tipping or slipping of individual articles. After passing through a supply position, in which the second support bar 54 may be positioned approximately centrally over the second support level 40 of the loading station 36 (cf. FIG. 8), the layer of articles 10 contacts the second support bar 54 during the further transfer (cf. FIG. 9); thereafter, it moves rightward ahead of the layer of articles 10 during its further transfer movement until the first push bar 42 is raised and moved out of engagement with the layer of articles 10 (cf. FIG. 10). As soon as the first push bar 42 of the transfer unit 34 has ended its transfer movement and is moved vertically upward along the second path 52 in the area of the loading station 36 (FIG. 11), a second push bar 56, associated with the loading station 36, is lowered, which, together with the second support bar 54, can ensure that the layer of articles 10 is centred and positioned centrally on the loading station 36 (FIG. 11, FIG. 12) before the layer of articles 10 can be transferred from the loading station 36 to the pallet segment 44 below it (FIG. 13).

Such a transfer of the layer of articles 10 may occur, e.g., by means of a jalousie or plate gripper head that can unload a complete layer of articles 10 downward by opening or lateral movement of its moveable bottom.

Figure 12:
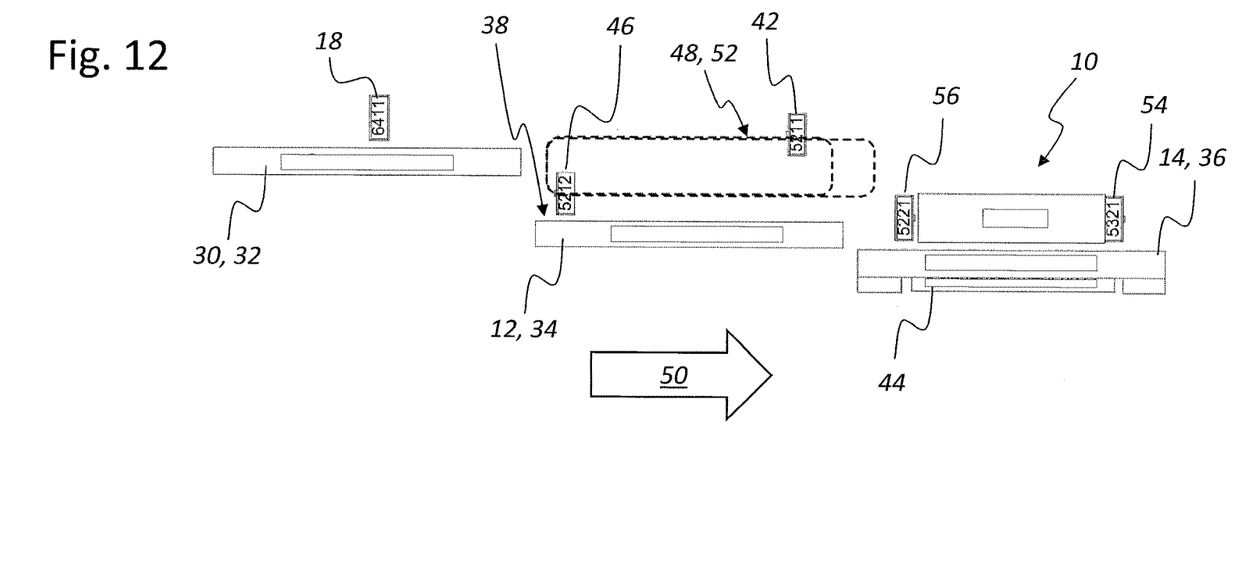
Figure 13:
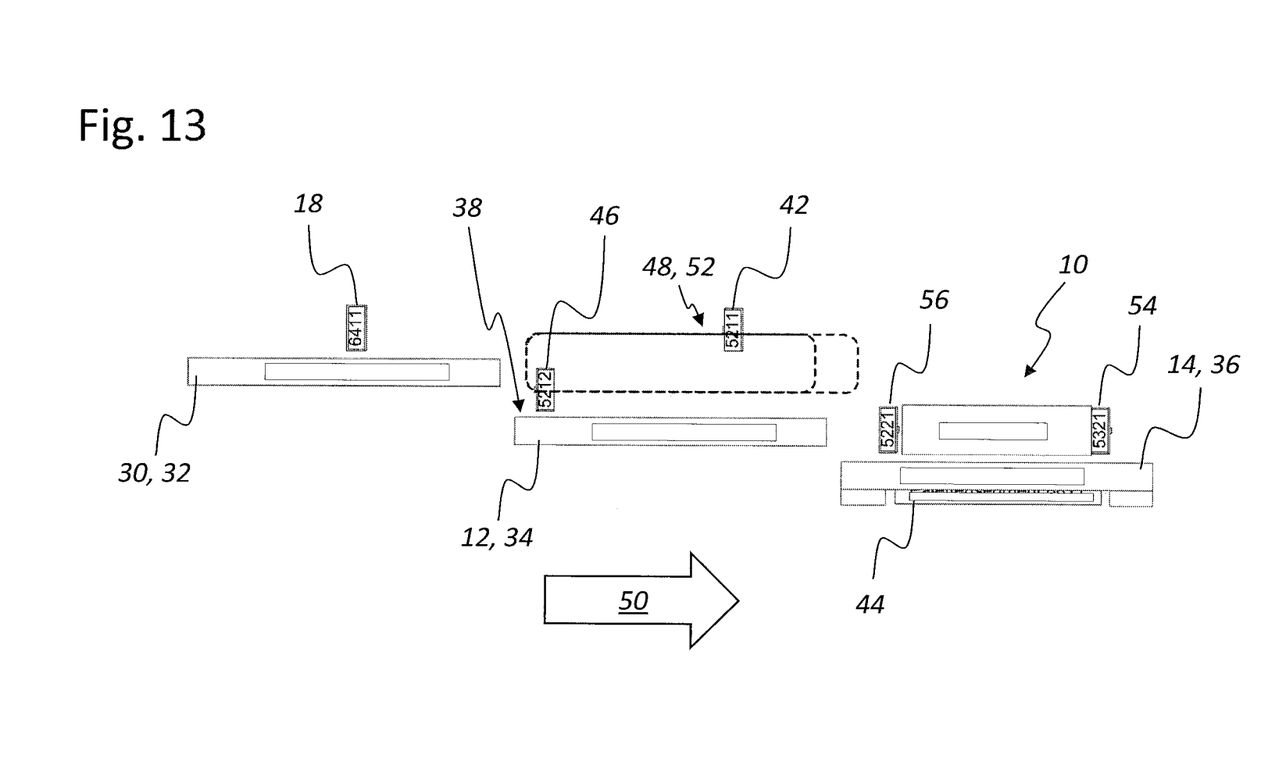

After the layer of articles 10 has been transferred to the loading station 36 (FIG. 11), there is no need for the support layers 38 and 40 of the first and second modules 12 and 14 to be aligned; accordingly, the first support level 38 of the first module 12 or the transfer unit 34 can already be returned to the height of the grouping system 32 (FIG. 12, 13).

It should be noted here that other courses and combinations of the transfer movements shown in FIGS. 3-13 with the same or similar interacting modules 12, 14, and 30 are possible without the principle of the transfer movement of cohesive layers of articles 10 being fundamentally modified. It should additionally be emphasised that the course of the transfer table 34 described above from the higher grouping system 32 to the lower loading station 36 is by no means limiting, and is offered by way of example only. Thus, there may be multiple layers of articles 10 stacked on top of one another in the stacking area of the pallet segment 44 after multiple transfers, such that it may be necessary to transfer another layer of articles 10 from the grouping system 32 to the loading station 36 by raising the transfer table 34 after receiving it. In this case—not shown here—the transfer table 34 is not lowered, as in FIGS. 7-11, with the layer of articles 10 on it to the level of the loading station 36, but rather, if necessary, to a level of a highest layer of articles 10 lying on it.

Another variant of the stapling method, not shown here, may optionally provide for several layers of articles 10 to be deposited simultaneously on the loading station 36. By simultaneous handling and stacking of several layers of articles 10, pallet changing times can be significantly reduced. This allows the loading station 36 to act as intermediate storage, allowing the necessary time for pallet changes to be minimised.

As noted above, another variant—not shown here—may comprise only the grouping system 32 and the loading station 36, whereby the height of the grouping system 32 must be adjustable in order to compensate for the various heights of the stacks of layers of articles 10 on the loading station 36. In this case, too, synchronised vertical movement of the two systems 32 and 36 is necessary in order to allow for transfer of the layer of articles during the vertical movement of the two support levels according to the invention.

The invention was described by reference to a preferred embodiment. However, persons skilled in the art will be aware that variations and modifications of the invention can be made without leaving the scope of the claims below.

REFERENCE NUMERALS

10 Layer or group of articles
12 First module
14 Second module
16 Articles, bundles, containers
17 Lateral guide
18 Push bar
19 Transfer device
20 Feed, forward movement
22 Pushing movement (push bar)
23 Vertical movement, hoisting movement (first and second modules)
24 Support level
30 Third module
32 Grouping system
34 Transfer unit
36 Loading station
38 First support level
40 Second support level
42 First push bar
44 Pallet segment
46 First support bar
48 First path
50 Direction of transport
52 second path
54 Second support bar
56 Second push bar

The invention claimed is:

1. A system for the horizontal transfer of articles, comprising:
a first vertically-movable hoist station module, comprising a first support level;
a second vertically-movable hoist station module, comprising a second support level, the second support level immediately downstream of the first support level in a direction of transport of a layer of articles;
position sensors configured to detect the current vertical positions of the first and second support levels;
a control configured to receive position signals from the position sensors indicating the current vertical positions of the first and second support levels and coordinate the vertical movements of the first and second vertically-movable hoist station modules; and
a transfer device configured to horizontally transfer the layer of articles from the first support level to the second support level by pushing the layer of articles during a coordinated vertical movement of the first vertically-movable hoist station module and second vertically-movable hoist station module, the transfer device comprising:
a push bar coupled to a push bar drive, the push bar configured to engage the rear of the layer of articles when the layer of articles is on the first support level.

2. The system of claim 1, wherein the first support level and the second support level form an approximately common support level during the coordinated vertical movement during at least a portion of the transfer of the layer of articles.

3. The system of claim 2, wherein the transfer device is configured to initiate the transfer of the layer of articles immediately before the formation of the approximately common support level.

4. The system of claim 2, wherein the coordinated vertical movement forms the approximately common support level for the duration of the transfer of the layers of articles from the first support level to a final position on the second support level.

5. The system of claim 2, further comprising a support bar configured to abut the front of the layer of articles during at least a portion of the transfer.

6. A method for the horizontal transfer of articles, comprising:
detecting, by position sensors, the positions of a first support level of a first vertically-movable hoist station module and of a second support level of a second vertically-movable hoist station module;
receiving, by a control, position signals from the position sensors corresponding to the current vertical positions of the first and second support levels;
coordinating, by the control, the vertical movements of the first and second vertically-movable hoist station modules; and
horizontally transferring, by a transfer device, a layer of articles from the first support level to the second support level during the coordinated vertical movement of the first and second vertically-movable hoist station modules, the horizontally transferring further comprising:

pushing, by a push bar of the transfer device, the layer of articles from the rear of the layer of articles from the first support level to the second support level.

7. The method of claim 6, wherein the first support level and the second support level form an approximately common support level during the coordinated vertical movement during at least a portion of the transfer of the layer of articles.

8. The method of claim 7, further comprising initiating the transfer of the layer of articles immediately before the formation of the approximately common support level.

9. The method of claim 7, wherein the coordinated vertical movement forms the approximately common support level for the duration of the transfer of the layers of articles from the first support level to a final position on the second support level.

10. The method of claim 6, further comprising abutting, by a support bar of the transfer device, the front of the layer of articles during at least a portion of the transfer.

11. A system for the horizontal transfer of articles, comprising:

a first vertically-movable hoist station module, comprising a first support level;

a second vertically-movable hoist station module, comprising a second support level, the second support level immediately downstream of the first support level in a direction of transport of a layer of articles;

a transfer device configured to horizontally transfer the layer of articles from the first support level to the second support level by pushing the layer of articles during a coordinated vertical movement of the first vertically-movable hoist station module and second vertically-movable hoist station module, the transfer device comprising:

a push bar coupled to a push bar drive, the push bar configured to engage the rear of the layer of articles when the layer of articles is on the first support level; and a control configured to coordinate the vertical movements of the first and second vertically-movable hoist station modules and the horizontal movement of the push bar.

* * * * *